March 5, 1963   G. S. GRANT   3,080,186
COLUMN AND MOUNTING SOCKET THEREFOR
Filed March 10, 1961   2 Sheets-Sheet 1

INVENTOR
GEORGE S. GRANT
ATTORNEY

March 5, 1963  G. S. GRANT  3,080,186
COLUMN AND MOUNTING SOCKET THEREFOR
Filed March 10, 1961  2 Sheets-Sheet 2

INVENTOR
GEORGE S. GRANT

ATTORNEY 3,080,186
COLUMN AND MOUNTING SOCKET THEREFOR
George S. Grant, 1111 Kilwinning St., Penticton,
British Columbia, Canada
Filed Mar. 10, 1961, Ser. No. 94,900
5 Claims. (Cl. 287—119)

This invention relates to improvements in a column and mounting socket therefor, appertains particularly to a novel structure for vertically supporting a column or post and allowing it to be rotatably adjusted into a selected position.

Though suitable for use with many kinds of equipment or apparatus where it is desired to carry an element on a rotatably adjustable post, a particular application of the invention will be found in a combined seat and desk assembly supported on a single column, as for school classroom use, whereby the seat and desk may be easily turned about a vertical axis to face in the direction desired.

An object of the invention is to provide a column and mounting socket that will assure the firm, steady support of the upright column yet allow of its easy rotation into another selected position in which it may be securely held against accidental rotative displacement.

A further object of the invention is to provide a relatively rotatable column and mounting socket normally secured against rotative movement and coupled in readily releasable engagement to permit of the turning of one relative to the other.

A further object of the invention is to provide a rotatably adjustable column normally held firm against unauthorized rotatable movement by releasable interlocking engagement with a fixed socket part.

A further object of the invention is to provide a rotatably adjustable column and a fixed supporting socket having separable interlocking complementary parts engageable by gravity in rotation arresting relation.

A further object of the invention is to provide a rotatably adjustable, single column support for a school classroom seat and/or desk or the like that may be recessed in a socket nested in the floor, whereby the floor cleaning operation is simplified and facilitated.

A still further object of the invention is to provide a rotatable column and mounting socket therefor of the nature and for the purposes specified that is characterized by structural simplicity, durability and low cost of manufacture, assembly and maintenance whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

Figure 1:
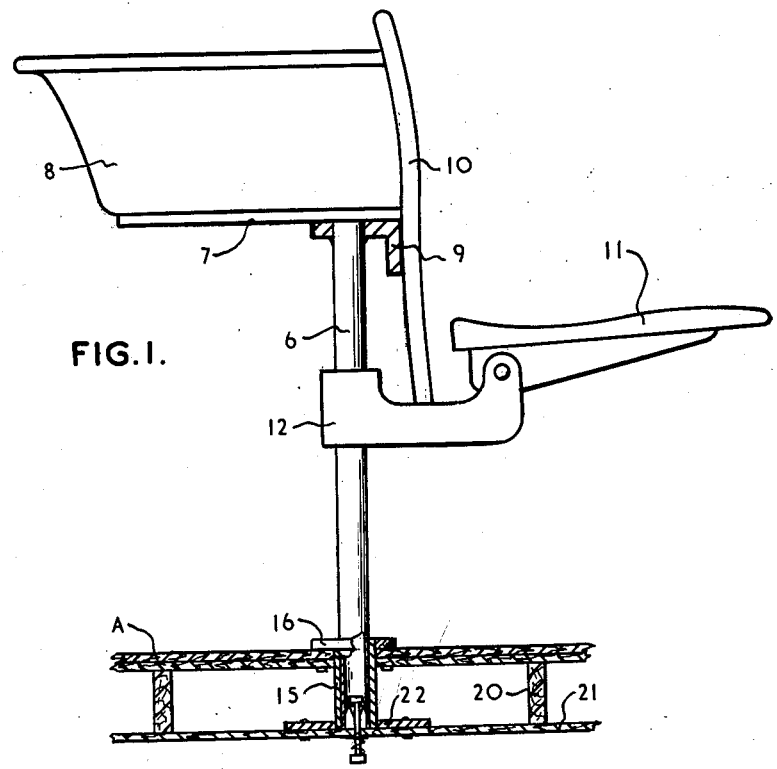
FIGURE 1 is an elevation of a preferred embodiment of the invention as applied to a school seat and desk combination.
Figure 3:
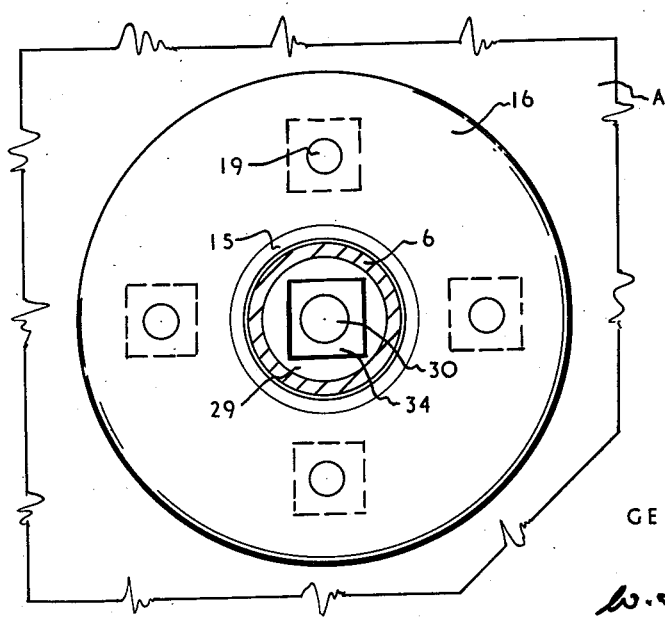
FIGURE 3 is a horizontal section of the column and socket, as seen on section line 3—3 of FIGURE 2.

Referring now particularly to the embodiment of the invention shown in FIGURE 1, the reference numeral 6 designates a cylindrical column that is formed of a length of iron pipe or the like. On its top is mounted a plywood base 7 that supports or forms the bottom of a desk 8 while welded on the upper end of the column and projecting laterally therefrom is an angle member 9 to which the desk base 7 is secured and serves as a bracket for the back 10 of the seat 11 that is suitably mounted on the column at an appropriate height by the horizontally extending seat support 12. The specific form of these parts may be varied as local conditions may require.

As it is essential in carrying out the invention that the column 6 be firmly supported in vertical position and steady and unmovable for normal use and yet allow of the seat and desk combination carried on it being turned when required, a novel structure of column bottom and accommodating supporting socket is employed. The bottom of the column pipe 6 is provided with four evenly spaced tapered teeth 14, their tips being truncated to avoid bottoming.

A cylindrical socket 15 with an external flange 16 at its upper end is recessed in the building floor, designated A with a water seal or gasket 17 underlying the flange. An annular bearing plate 18, encircling the depending socket is applied on the underside of the floor and through appropriately spaced perforations in the plate, bolts 19 pass upwardly to screw into the socket flange 16 securing the same firmly in place. Traversing and secured to the bottom of adjacent floor joists 20 I apply a sub-floor member 21 of plywood or the like and surmounting or atop this sub-floor member 21 is a collar 22 attached to the sub-floor, the specific stabilizing or anchoring collar employed herein is an eight inch square plywood plate bored to snugly accommodate the bottom of the socket that descends to engage the upper surface of the sub-floor and this plywood square is suitably connected to the sub-floor by nuts and bolts 23.

The socket that serves as a concentric housing for the lower end of the column may be lined with a bushing 24 of such suitable material as brass, fibre or the like and within which the column may slide or turn with ease.

Figure 2:
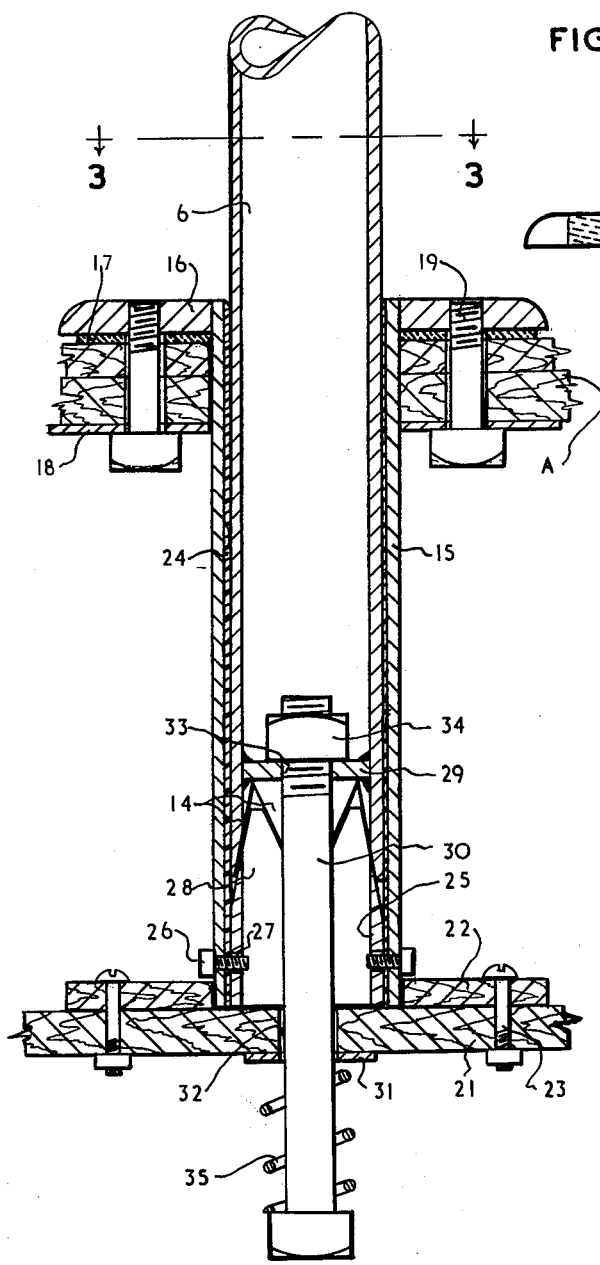
FIGURE 2 is an enlarged vertical section of the lower end of the rotatable column and its mounting socket installed in a conventional floor structure.
Figure 5:
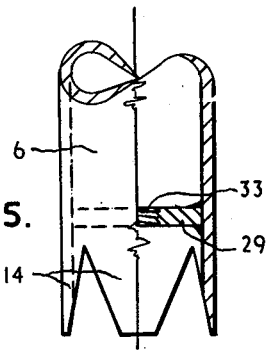
FIGURES 4 and 5 are half elevation, half sections of the socket and lower end of the column respectively.
Figure 4:
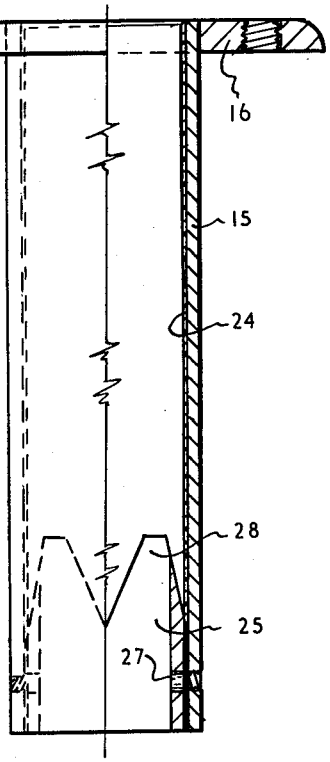

Secured in the base of the socket 15 is a member 25 that serves as a rest or stop for the bottom end of the column 6 and is here shown as a short length of pipe similar to the column pipe and is disposed coextensive therewith. Held in the lower end of the socket by screw bolts 26 threaded through the socket and projecting into accommodating bores 27 in the stop member, this stop or rest has its upper end provided with four evenly circumferentially spaced truncated teeth 28 complementary to and engageable by the teeth 14 on the bottom of column 6. Accordingly, it will be clear, on reference particularly to FIGURES 2, 4 and 5, that when the lower end of column 6, carrying its seat and desk, is lowered into the socket 15, the teeth 14 on the bottom of the column will engage and mesh and interlock with the complementary teeth 28 on the rest member 25 and provide firm, steady non-rotatable support for the column yet allow the column, if raised until the interlocking teeth are clear, to be turned on its vertical axis and lowered to bring the column and rest teeth again into engagement in a new rotative position. With four teeth on the rest and column bottom as described, it will be obvious that four selective positions divided at 90° angles are available and also that by increasing the number of interlocking complementary teeth on the separable engaging parts, a larger number of selective rotary positions may be obtained.

To prevent the unauthorized removal of the column 6 together with the seat and desk associated with it and yet permit the limited vertical lift required to clear the engagement of the interlocking complementary teeth 14 and 28 when it is desired to rotate the column into a new position, a simple travel-limiting device is employed that holds the column captive. A horizontal disk-like insert 29 is welded in the column 6 near the lower end of column 6 but above the top of the teeth 14. An elongated bolt 30 carrying a washer 31 passes upwardly through a bore 32 in the sub-floor 21 and is threaded through a threaded bore 33 in the insert 29 and provided with a nut 34 on its projected end. By allowing a suitable free length of the shank of the bolt 30 between its head and the underside of the sub-floor 21, the required vertical sliding of the column that enables it to be turned as desired is obtained. On the other hand, if is desired that the column be anchored securely against rotation, the bolt is fully threaded in the insert until the bolt head compresses the washer 31 tightly against the sub-floor 21 and the nut 34 is subsequently tightened down as a lock nut against the upper face of the insert. When found desirable, a coil spring 35 may encircle the bolt between its head and the washer 31. If the upper end of the column 6 be left open, it will be found convenient to use a long socket wrench to hold and center the nut.

In the event that the column is to be mounted on a concrete floor, the position of the bolt 30 would be inverted with the bolt passing downwards freely through an axial perforation in the insert and having its lower end threading into a metal anchor plate imbedded in the concrete.

It will now be apparent that the present invention is capable of assuming many forms and suitable for application to a wide variety of uses where it is desired to have a normally fixed and steady part or member selectively rotatable relative to its mounting as occasion may require.

The embodiment of the invention illustrated and described herein as a mounting and support for a school classroom seat and desk combination is possessed of many advantages including the following:

(1) it enables use of a desk, seat and back assembly very similar to those currently used, (2) can be economically produced from malleable iron and steel, being both lighter and more durable, (3) is held against swing while child is seated, (4) has mounting that cannot be rocked and loosened, (5) retains original positioning in floor so that room arrangement never becomes disorderly, and (6) having only a single, small diameter post per unit, the floor cleaning is greatly simplified.

From the foregoing description taken in connection with the accompanying drawings, it will be manifest that a column and mounting socket therefor is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. A combination seat and desk support comprising a column, a socket concentrically embracing the lower end of the column, the socket being of appreciable length extending through a floor with the lower end of the socket resting on a sub-floor, means securing the socket to the first said floor, a rest member within the socket, confronting teeth on the lower end of the column and the rest member co-acting under gravity to normally retain the column in a desired position relatively to the rest member, means permitting limited axial sliding movement of the column within the socket relatively to the rest member to disengage the column from the rest member and permit rotating of the column relatively to the rest member within the socket.

2. A combination seat and desk support comprising a column, a socket concentrically embracing the lower end of the column, the socket being of appreciable length extending through a floor with the lower end of the socket resting on a sub-floor, a radial flange on the upper end of the socket to rigidly secure the socket to the first said floor, a rest member within the socket formed with truncated teeth, truncated teeth on the lower end of the column co-acting under gravity with the teeth on the rest member, the co-acting teeth normally retaining the column in a predetermined position relatively to the rest member, means permitting limited axial sliding movement of the column within the socket relatively to the rest member to disengage the teeth of the column from the teeth of the rest member and permit rotating of the column in the socket relatively to the rest member.

3. A combination seat and desk support comprising a hollow column formed with teeth on its lower end, a socket of appreciable length concentrically embracing the lower end of the column, the socket extending through a floor with its lower end resting on a sub-floor, a flange on the upper end of the socket, bolts connecting the flange with the first said floor, a collar connected to the sub-floor and embracing the lower end of the socket, a rest member within the socket formed with teeth to co-act with the teeth on the column and retain the column in a desired position relatively to the rest member, a disc member located within the hollow column and formed with a central aperture, a bolt extending upwardly through the sub-floor and through the disc, a nut on the upper end of said bolt above said disc, and a spring encircling the stem of the bolt and located between the head of the bolt and the sub-floor.

4. A combination seat and desk support comprising a hollow column formed with truncated teeth on the lower end, a socket of appreciable length concentrically embracing the lower end of the column, a sleeve between the column and the socket, the socket extending through a floor with its lower end resting on a sub-floor, a flange on the upper end of the socket, bolts connecting the flange to the first said floor, a collar connected to the sub-floor and embracing the lower end of the socket, a rest member within the socket formed with truncated teeth to co-act with the truncated teeth of the collar and retain the column in a desired position relatively to the rest member, means removably securing the rest member to the sleeve and the socket, a disc rigidly secured within the hollow column adjacent the teeth on the lower end thereof, a bolt having its stem extending through the sub-floor and the disc, the nut of the bolt resting on the upper face of the disc, and a spiral compression spring encircling the stem of the bolt and located between the head of the bolt and the sub-floor.

5. For a combined seat and desk, the combination with a floor and a sub-floor spaced substantially therebelow, a socket sleeve of appreciable length with an exterior flange at its upper end depending through the floor to the sub-floor and being supported by said flange resting on the floor, a gasket between the flange and the upper floor, a rest member within the socket and co-acting with the sub-floor, means associated with the sub-floor embracing the lower end of the socket, confronting teeth on the lower end of the column and the upper end of the rest member to maintain the column in a predetermined position relatively to the rest member, and means permitting limited axial movement of the column relatively to the rest member to disengage the column from the rest member and permit rotating the column within the socket.

References Cited in the file of this patent

UNITED STATES PATENTS

| | | |
|---|---|---|
| 483,266 | Schindler | Sept. 27, 1892 |
| 820,194 | Hoffman | May 8, 1906 |
| 1,126,219 | Hupp | Jan. 26, 1915 |
| 1,173,316 | Segal | Feb. 29, 1916 |
| 2,895,752 | De Barrie | July 21, 1959 |